United States Patent [19]

Strong

[11] Patent Number: 4,521,230
[45] Date of Patent: Jun. 4, 1985

[54] SELF-CLEANING FURNACE FILTER CONSTRUCTION

[76] Inventor: John C. Strong, 25 Comanche Trail, Malvern, Ohio 44644

[21] Appl. No.: 634,598

[22] Filed: Jul. 26, 1984

[51] Int. Cl.³ .............................................. B01D 46/38
[52] U.S. Cl. ........................................ 55/274; 55/290; 55/272; 55/351
[58] Field of Search ................ 55/218, 272, 274, 267, 55/290, 293, 351, 354; 210/107, 392

[56] References Cited

U.S. PATENT DOCUMENTS

| | | | |
|---|---|---|---|
| 2,178,463 | 10/1939 | Bahnson | 55/272 |
| 2,830,674 | 4/1958 | Dolf et al. | 55/218 |
| 3,375,638 | 4/1968 | Dungler | 55/351 |
| 3,823,533 | 7/1974 | Alverson et al. | 55/504 |

Primary Examiner—Bernard Nozick
Attorney, Agent, or Firm—Frease & Bishop

[57] ABSTRACT

A self-cleaning filter construction for a forced air furnace which includes an endless belt filter which passes around and extends between two roller members. A suction system is mounted in a position to clean both the interior and exterior surfaces of the endless filter. The filter may be moved past the suction manifolds by a motor drive. During filter movement the suction source cleans the interior and exterior of the filter. The device also may include a timing device so that the suction system-filter motor drive system may be operated for any desired period of time and at any desired interval.

8 Claims, 5 Drawing Figures

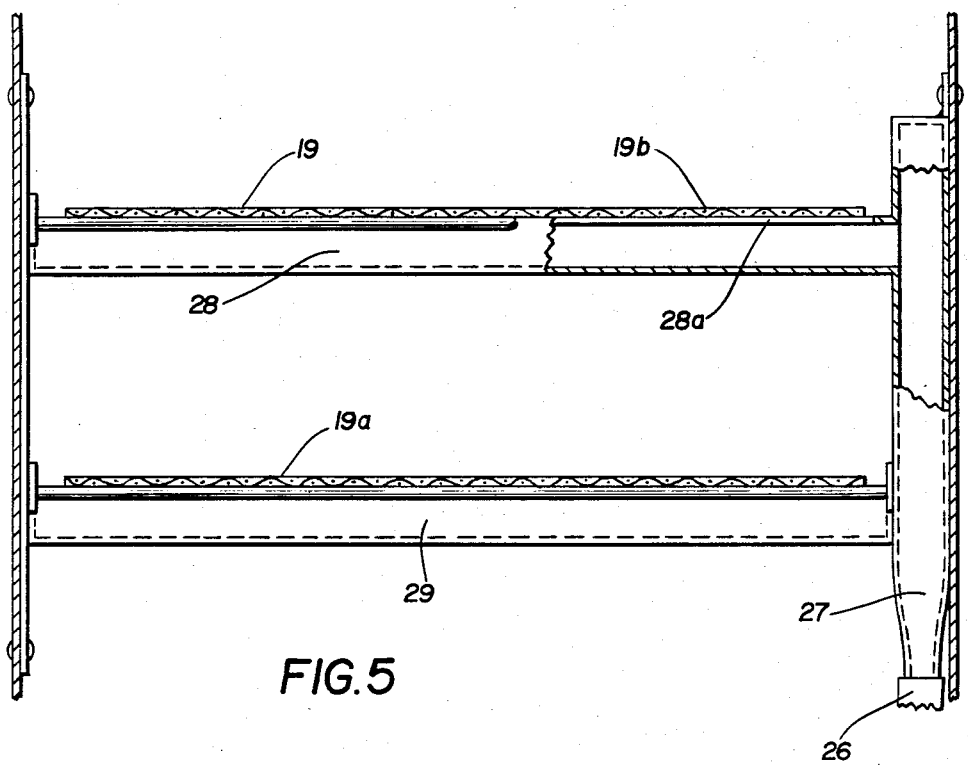
FIG. 5
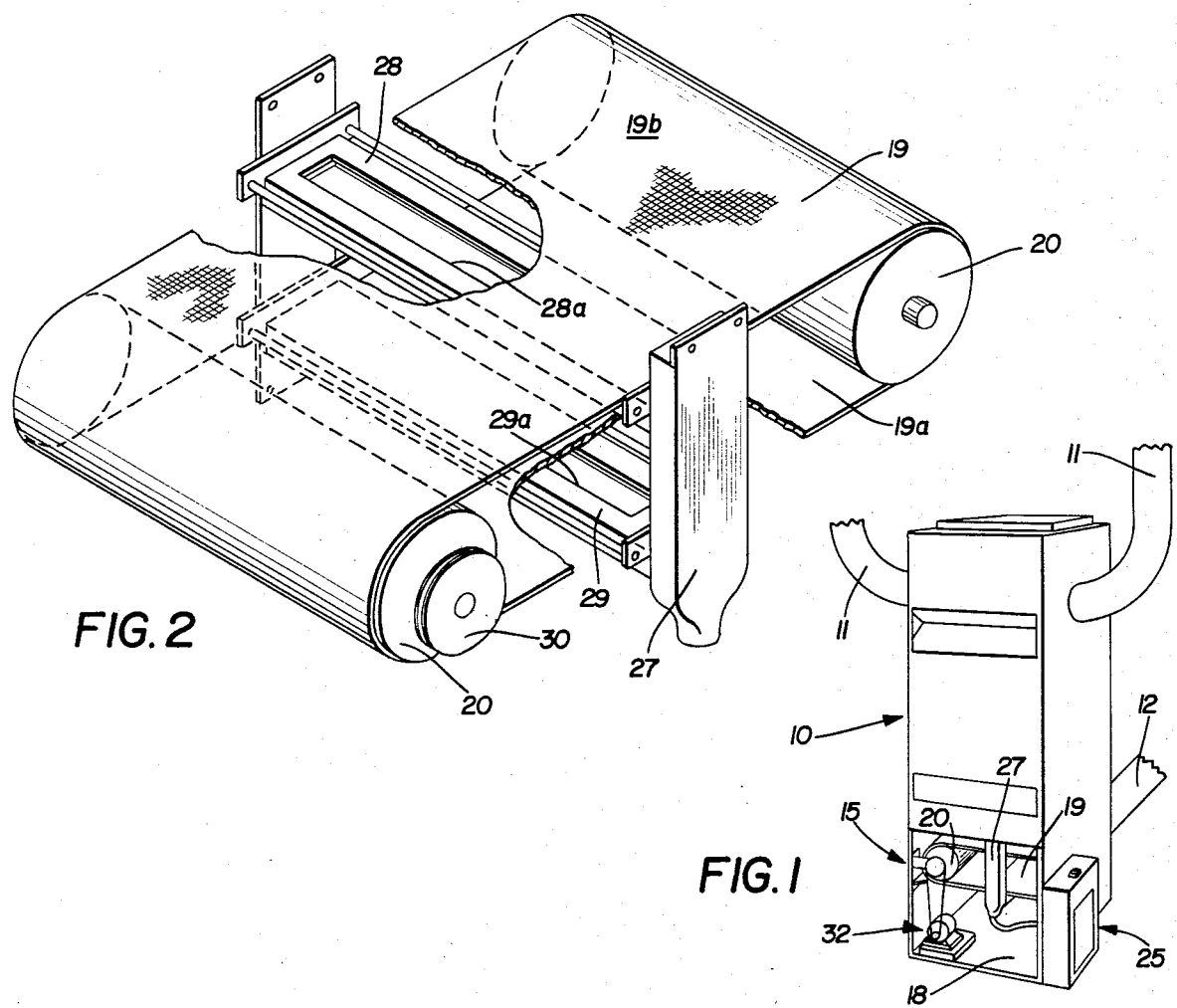
FIG. 2
FIG. 1

SELF-CLEANING FURNACE FILTER CONSTRUCTION

This invention relates generally to furnaces or other forced air heating or cooling devices and more specifically the invention relates to a self-cleaning filter construction for use preferably in a residential forced air heating or air conditioning system.

The most common form of residential heating systems today is of the forced air variety in which air is heated from the heat generated by the combustion of a fuel source and forced throughout a residential structure by means of a fan. Most of these systems are of the closed air variety in which return ducts are located in the rooms to be heated for the passage of cool air back to the heating device or furnace. In many parts of the country, the most common source of fuel is natural gas, however, oil is commonly employed as a fuel source in forced air heating systems. Also, electricity can be utilized as a heat source.

In the typical closed system the warm air is heated, and moved by a fan to the rooms to be heated, and returned to the furnace for reheating. The returned air invariably picks up and carries with it to the furnace, dust, dirt, pollen and other forms of undesirable and unwanted material. As a consequence it is common to include a filter in such forced air furnaces to remove the impurities prior to its passage into the heating chamber of the furnace so that the warmed air, as it is passed to the room to be heated, is as clean and impurity free as possible.

Under normal conditions, the filter which is employed to remove the impurities from the air will eventually become clogged with the material which the filter is removing from the air as the air passes through the filter. When these filters become dust laden and clogged, the efficiency of the heating unit is seriously reduced and a considerable amount more fuel is consumed to heat a structure because the quantity of air passing through a dirty filter is less than with a clean filter for a given fuel consumption. Consequently, a good deal of the heat of combustion passes out the chimney when the heating unit's filter had become dirty and clogged.

To remedy the problem, it is common to provide a replaceable filter which is changed from time to time, depending upon the amount of time the furnace is used and the amount of impurities that are present in the air being heated. Human nature is such that these replaceable filters are normally not changed as frequently as they ought to be, and energy and the cost thereof is, therefore, wasted because of the inefficient furnace operation. Further, the cost involved in replacing the removable and disposable filters can become a significant factor, particularly if the filters are changed as frequently as they need to be for efficient operation.

Accordingly, a need exists for a device for filtering the air in a forced air furnace system which eliminates the necessity of frequently changing, from time to time, a filter, and at the same time providing a device which filters the air and remains substantially free of impurities automatically. Such a device desirably can be incorporated conveniently in any conventional forced air furnace system and will operate efficiently under all conditions and will be substantially maintenance free except for the occasional removal and disposal of material cleaned from the filters.

Accordingly, it is a primary object of the present invention to provide a self-cleaning furnace filter system in which an endless belt-type filter is positioned in the path of air moved through the furnace to remove impurities from the air prior to its being heated.

It is further object of the present invention to provide a self-cleaning furnace filter construction in which the endless belt filter passes over a plurality of vacuum or suction manifolds which remove the particles of air impurities as they are trapped by the filter during passage of air therethrough.

It is a still further object of the present invention to provide a self-cleaning furnace filter construction in which the endless belt filter is selectively in movement during those times in which the furnace is in operation and in which the vacuum or suction system also selectively operates during that time in which the furnace is in operation and the filter needs cleaning.

It is a still further object of the present invention to provide a self-cleaning furnace filter construction in which means are provided to signal the furnace operator that a receptacle that is provided for impurities removal has become full and needs to be emptied.

These and other objectives and advantages will be apparent from the following detailed description when taken in connection with the various figures of the accompanying drawings.

BRIEF DESCRIPTION OF THE DRAWINGS

A preferred embodiment of the invention, illustrative of the best mode in which applicant has contemplated applying the principles—is set forth in the following description and shown in the drawings and is particularly and distinctly pointed out and set forth in the appended claims.

In the drawings:

FIG. 1 is a general schematic perspective view of a typical forced air furnace which incorporates the self-cleaning filter of the present invention;

FIG. 2 is a fragmentary perspective view, with portions broken away, showing the endless belt and the vacuum cleaning manifolds of the self-cleaning furnace filter construction of the present invention;

FIG. 5 is a vertical section taken on the lines 5—5 of FIG. 3.

Similar numerals refer to similar parts throughout the various figures of the drawings.

Figure 4:
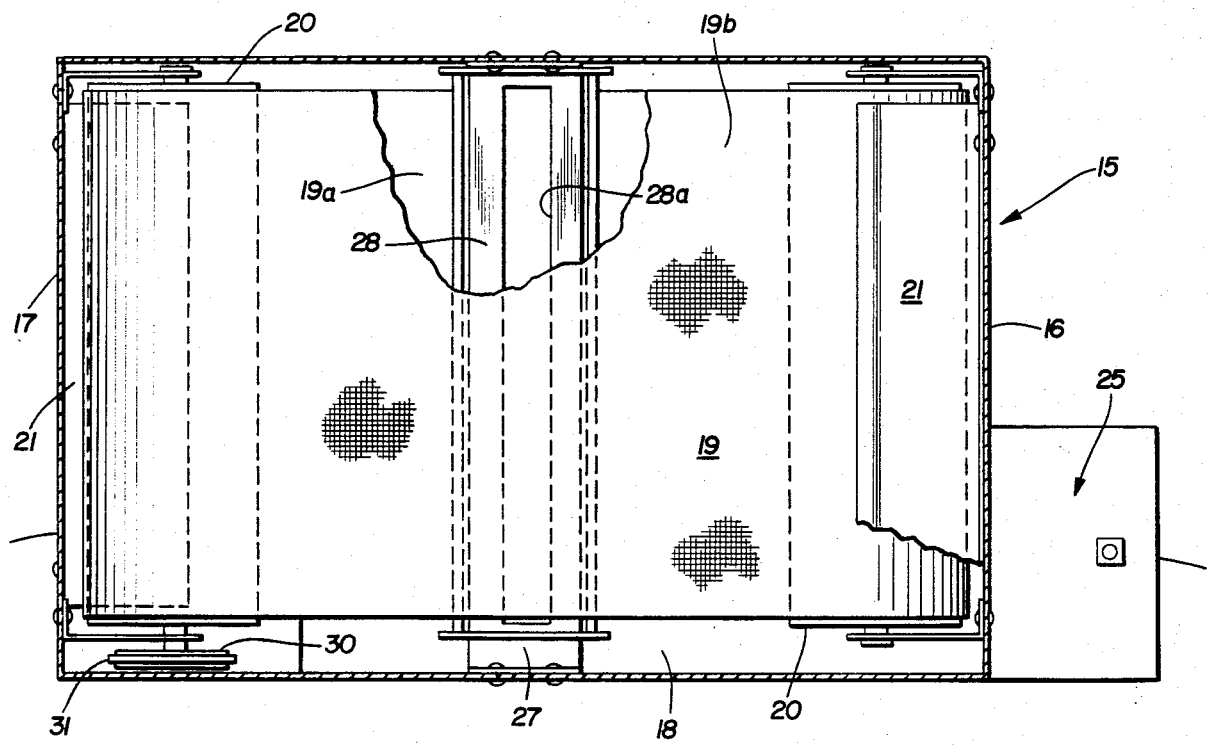
FIG. 4 is a top plan view of the self-cleaning furnace filter construction of the present invention.

In the following description the self-cleaning filter construction of the present invention will be described in the environment of a residential furnace. It should be understood that the principles of the present invention can be used with equal effectiveness with a residential air conditioning system wherein the air is cooled. Likewise, the principles of the present invention can be employed for commercial or industrial purposes in any circumstances where air had particulate matter that should be removed from the air by means of a filter.

Referring to FIG. 1 of the drawings, a typical residential warm air furnace is indicated generally at 10 and includes warm air ducts 11 and a cool air return or duct 12. The self-cleaning furnace filter construction of the present invention is generally indicated at 15 and is located in the lower portion 18 of the furnace which is enclosed by typical panels. A lower panel has been removed and not shown so that the location of the filter system 15 can be readily seen. Above the filter system 15 is a typical combustion chamber (not shown) which also includes a fan system (not shown). The typical air flow pattern through a furnace involves air passing from the cold air duct 12 into the lower portion of the furnace, upwardly through filter system 15, through the combustion chamber/heat exchanger where the air is warmed and out warm air duct 11 for distribution to registers in rooms which are to be heated by the furnace system.

The self-cleaning filter of the present invention includes a pair of rollers 20 which are removably mounted by any suitable means to opposite sides 16 and 17 of the lower portion of the furnace chamber or interior 18. An endless belt-type filter 19 is mounted upon and extends between and around rollers 20. The rollers 20 can be constructed of any convenient material to suit the environment in which the device is to be used. For example, aluminum can be used as a material for constructing the rollers or the rollers may be constructed from a suitable plastic material. Endless belt 19, as in the installed position, will have an inner surface 19a and an outer surface 19b. A pair of air blocks 21 is mounted in the position shown best in FIG. 3 to aid in air flowing through the system to flow through the filter.

Figure 3:
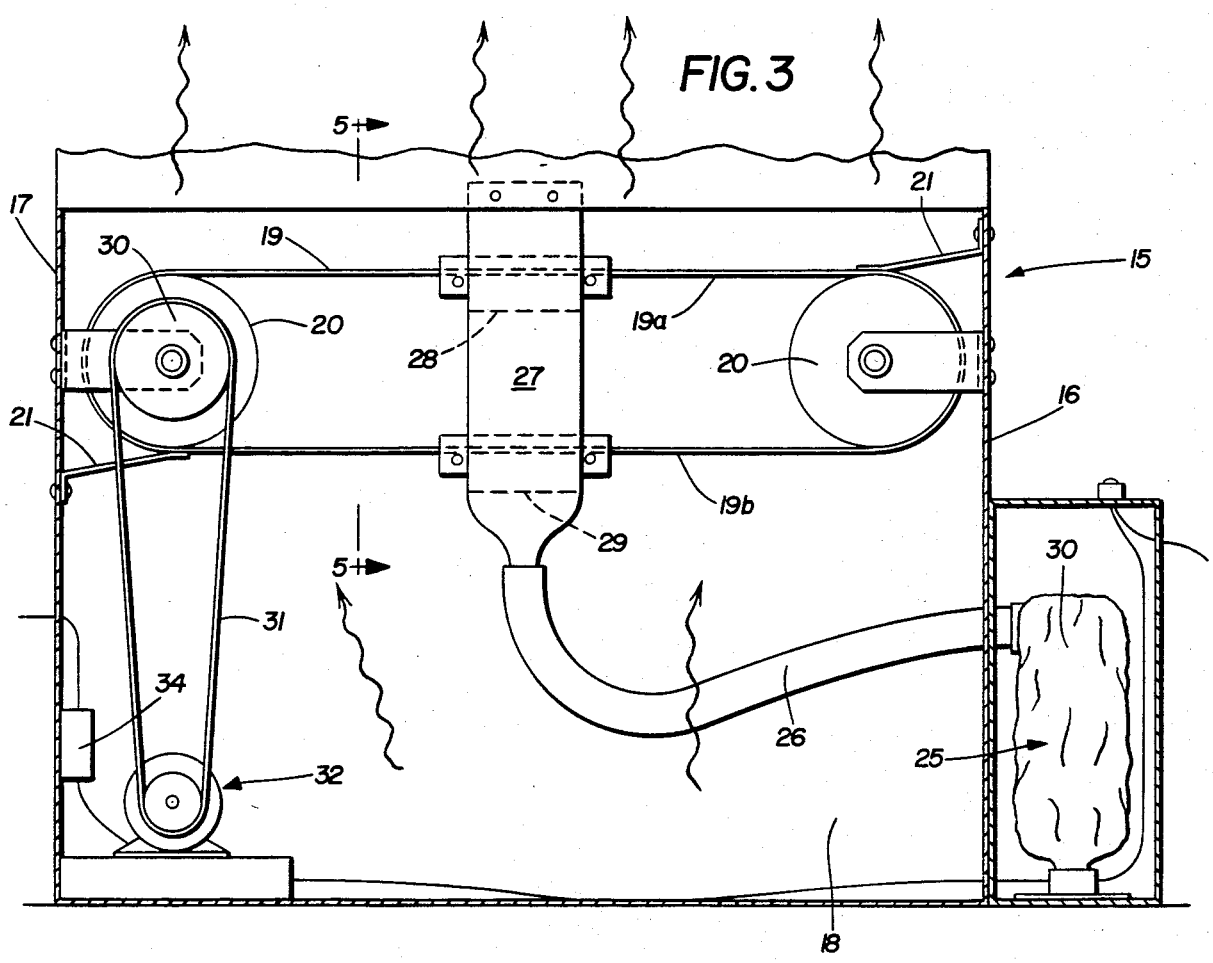
FIG. 3 is a side elevation, partly in section, of the self-cleaning furnace filter construction of the present invention.

Referring to FIG. 3, when furnace 10 is operated, air in chamber 18 that is supplied through cold air duct 12 passes upwardly through filter 19 in the direction of the wavey arrows. As the air passes through the filter 19 the particulate matter, such as dust, dirt, etc., will be filtered from the air by filter 19, which is substantially coextensive with the entire horizontal cross section of the lower chamber 18.

After a period of time, the filter 19 will become contaminated with the dust and other particulate matter that has been filtered from the air. In accordance with the present invention, a suction cleaning system is mounted within lower chamber 18 of the furnace to clean inside surface 19a and outside surface 19b of filter 19. To accomplish this cleaning, a source of suction generally indicated at 25 communicates by hose 26 with a vacuum manifold 27. An upper header 28 and lower header 29 are mounted extending from front to back of chamber 18. Upper header 28 includes an opening 28a which is formed and extends substantially the entire width of the belt 19, and lower header 29 has a similar opening formed therein which likewise extends substantially coextensively with the width of filter 19.

As best seen in FIGS. 2 and 3, lower surface 19a of belt 19 passes over opening 28a, and outside surface 19b of belt 19 passes over opening 29a of the lower header 29.

When the filter becomes laden with enough accumulated material that it needs to be cleaned, the endless belt filter 19 is driven by roller 20 whereby the entire filter passes past openings 28 and 29. At the same time that the belt is being driven, a suction source is applied to hose 26 and draws the dust, etc. from the filter and into a collection container 30.

The roller 20 which drives filter 19 is driven by pulley 30, belt 31 and motor pulley assembly 32. The motor pulley assembly 32 is preferably of a fractional horsepower electric-type motor which can be powered from ordinary house current normally available in most residences.

In a typical home installation, the dimensions of the furnace would be approximately 18" from front to back and 20 to 24" from side to side. The rollers 20, in such an installation, would be approximately 4" in diameter and the width of the endless belt filter 19 would be approximately 18" so that it would extend substantially from the front to the back of the chamber.

In actual use, during the operation of the device wherein the filter 19 is driven by rollers 20 past the vacuum headers 28 and 29 to clean dust from the filter, the linear speed of the filter movement around the rollers would be such that it would take approximately 2 to 3 minutes for the filter 19 to make one complete traversal around the rollers and past headers 28 and 29. Thus, the size of pulley 30 and pulley motor assembly 32 would be determined by the particular installation and is a matter merely of choice.

An important feature of the present invention is that the filter 19 is moved for cleaning selectively and the suction source only operates during the time when the filter is moving past vacuum headers 28 and 29. A typical standard timing device 34 could be used to operate vacuum source 25 and motor assembly 32. This timing device could be of the variable type or it could be of the type that could be set to operate at any selective interval. Motor assembly 32 may be preferably powered by standard 110/60 cycle house current. Likewise, a signal such as a light or buzzer may be incorporated in the collection container 30 so that when the container becomes full a signal may be given to alert the homeowner that the refuse container needs to be emptied.

Another important feature of the invention is that during filter cleaning, the movement of air through the filter as introduced by the suction system is counter to the normal movement of air through the filter when the filter is operating to clean air to be distributed within the residence. Thus, gravity will aid the vacuum system in removing dirt from filter 19 during the cleaning process.

The filter 19 may be constructed in accordance with the present invention from any suitable filter material, such as woven fiber glass mesh and should last from four to five years under normal residential operating conditions. It can be seen, however, that from time to time filter 19 will need to be replaced and for this purpose the rollers are mounted by standard hardware, not shown, which permits easy removal of the rollers from the interior of the furnace so that a new filter may be placed around the rollers.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the self-cleaning furnace filter construction is constructed and used, the characteristics of the construction, and the advantageous, new and useful results obtained; the new and useful structures, devices, elements, arrangements, parts, and combinations are set forth in the appended claims.

I claim:

1. A self-cleaning filter construction for use in a forced air system of the type in which air is moved by a blower from the system to a remote position through ducts, including a system chamber through which air to be moved passes, a pair of roller members mounted on opposite sides of the chamber, a generally horizontally oriented endless belt-type filter extending and movable between and around the rollers, said filter thereby presenting two surfaces substantially entirely across the chamber and in the path of air flow to filter entrained particles from the air means to drive said rollers and endless belt filter, suction manifold means mounted within the chamber having a first and second manifold header, each manifold header having a suction manifold opening, one of said manifold openings being located adjacent to one of the filter surfaces, and the other of the manifold openings being located adjacent to the other of the filter surfaces, and means for applying a suction force to each of said manifold openings.

2. Self-cleaning filter construction as defined in claim 1 in which the motor drive means and suction means include means for selectively timing the operation of the motor means and the suction means.

3. Self-cleaning filter construction as defined in claim 1 in which said endless belt filter is removably mounted between and around said rollers.

4. Self-cleaning filter construction as defined in claim 1 in which said motor drive means is selectively operable for only a period of time sufficient for the entire inner and outer filter surfaces to pass across said suction manifold.

5. Self-cleaning filter construction as defined in claim 1 in which the suction means conveys particles trapped by the endless belt filter to collection means.

6. Self-cleaning filter construction as defined in claim 5 in which said collection means includes signal means to indicate that the collection means has become full.

7. Self-cleaning filter construction as defined in claim 6 in which said filter means includes a visual signal.

8. Self-cleaning filter construction as defined in claim 6 in which said signal means includes an audible signal.

* * * * *